United States Patent
Begeja et al.

(10) Patent No.: US 9,313,444 B2
(45) Date of Patent: *Apr. 12, 2016

(54) RELATIONAL DISPLAY OF IMAGES

(71) Applicant: AT&T Intellectual Property I, L.P., Atlanta, GA (US)

(72) Inventors: Lee Begeja, Gillette, NJ (US); David Crawford Gibbon, Lincroft, NJ (US); Raghuraman Gopalan, Freehold, NJ (US); Zhu Liu, Marlboro, NJ (US); Eric Zavesky, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,992

(22) Filed: Jun. 29, 2015

(65) Prior Publication Data
US 2015/0304595 A1    Oct. 22, 2015

Related U.S. Application Data (63) Continuation of application No. 14/528,318, filed on Oct. 30, 2014, now Pat. No. 9,100,616, which is a continuation of application No. 14/219,422, filed on Mar. 19, 2014, now Pat. No. 8,902,361, which is a continuation of application No. 13/651,616, filed on Oct. 15, 2012, now Pat. No. 8,717,500.

(51) Int. Cl.
*H04N 5/445* (2011.01)
*H04N 5/45* (2011.01)
(Continued)

(52) U.S. Cl.
CPC .......... *H04N 5/44591* (2013.01); *G06K 9/4671* (2013.01); *G06K 9/6201* (2013.01);
(Continued)

(58) Field of Classification Search
CPC . H04N 5/45; H04N 21/4316; H04N 5/44591; H04N 5/44504; H04N 5/44543; H04N 5/44513; H04N 5/2624; H04N 5/2628; H04N 5/265; H04N 5/272; H04N 5/262; H04N 9/75; H04N 21/47; H04N 21/485; H04N 21/44008; H04N 21/4725; H04N 21/8153; H04N 21/8455; H04N 21/8352; G09G 2340/125; G09G 2340/10; G09G 5/373; G09G 5/377; G09G 5/00; G06T 3/40
USPC ......... 348/563–565, 567–569, 584, 588, 598, 348/586, 561, 581; 345/629, 660
IPC .................. H04N 5/445, 5/45, 9/74, 5/44, 5/50
See application file for complete search history.

(56) References Cited

U.S. PATENT DOCUMENTS 6,734,877 B1    5/2004 Honda et al.
6,784,945 B2    8/2004 Norsworthy et al.
(Continued)

OTHER PUBLICATIONS

Website: Wordle—Beautiful Word Clouds, http://www.wordle.net/, downloaded Mar. 2, 2015, 1 pg.
(Continued)

*Primary Examiner* — Sherrie Hsia
(74) *Attorney, Agent, or Firm* — Guntin & Gust, PLC; Jay H. Anderson (57) ABSTRACT

A method and apparatus for displaying a plurality of secondary images based on image data of a primary image include displaying a primary image and a plurality of secondary images based on the image data of the primary image. Each of the plurality of secondary images is displayed having a size based on a relevance of each respective one of the plurality of secondary images to the primary image. The primary image can be selected from a plurality of images or a frame of a video. Subsets of secondary images can be displayed in clusters including images having content similar to particular content of the primary image.

20 Claims, 7 Drawing Sheets

(51) Int. Cl.
- *H04N 5/50* (2006.01)
- *G09G 5/00* (2006.01)
- *H04N 21/431* (2011.01)
- *H04N 21/44* (2011.01)
- *H04N 21/4725* (2011.01)
- *H04N 21/81* (2011.01)
- *H04N 21/8352* (2011.01)
- *H04N 21/845* (2011.01)
- *G09G 5/373* (2006.01)
- *G09G 5/377* (2006.01)
- *G06K 9/46* (2006.01)
- *G06K 9/62* (2006.01)
- *G06T 3/40* (2006.01)

(52) U.S. Cl.
CPC ................ *G06K9/6218* (2013.01); *G06T 3/40* (2013.01); *G09G 5/00* (2013.01); *G09G 5/373* (2013.01); *G09G 5/377* (2013.01); *H04N 5/445* (2013.01); *H04N 21/4316* (2013.01); *H04N 21/44008* (2013.01); *H04N 21/4725* (2013.01); *H04N 21/8153* (2013.01); *H04N 21/8352* (2013.01); *H04N 21/8455* (2013.01); *G09G 2340/04* (2013.01); *G09G 2340/14* (2013.01)

(56) References Cited

U.S. PATENT DOCUMENTS

| | | |
|---|---|---|
| 7,228,061 B2 | 6/2007 | Mori et al. |
| 2004/0061805 A1 | 4/2004 | Shibamiya et al. |
| 2006/0119911 A1 | 6/2006 | Narusawa |
| 2006/0203012 A1 | 9/2006 | Nakajima |
| 2010/0026721 A1 | 2/2010 | Park et al. |

OTHER PUBLICATIONS

Website: Internet Archive Way Back Machine; Search for Wordle—Beautiful Word Clouds; http://web.archive.org/web/20080612120806/http://wordle.net/, downloaded Mar. 2, 2015, 1 pg.

| IMAGE ID | DATE | TIME | PEOPLE | OBJECT | LOCATION | ENVIRONMENT | CLUSTER IDs | RELEVANCE IDs (RELEVANCE VALUE) | CONTENT DESCRIPTION |
|---|---|---|---|---|---|---|---|---|---|
| 1 | 10/31/2010 | 1:00 PM | BOB SMITH; JON JONES; WILLIAM POST | PUMPKIN; SKELETONS | BOB SMITH'S HOUSE | INDOORS | 1,5,8, 16,24 | 5(80%), 10(50%), 45(20%) | [0.12, 0.34,0.01, ..., 0.03] |
| 2 | 12/25/2010 | 8:00 AM | MANON ST. PIERRE; JEAN LUC VANHASS | TABLE; CHAIR; VASE; ROSE | PARIS, FRANCE | OVERCAST | 6,9,15, 25 | 11(85%), 35(80%), 81(10%) | [0.14, 0.12,0.05, ..., 0.02] |
| .... | .... | .... | .... | .... | .... | .... | .... | .... | .... |
| 1000 | 3/5/2009 | 7:00 PM | ANDREA DELMON; LEWIS HENRY; AGATHA WINDSOME | NONE | SKOKIE, IL | INDOORS | 67,85, 91 | 36(66%), 85(33%), 96(90%) | [0.01, 0.18,0.27, ..., 0.32] |

*FIG. 4*

| IMAGE ID | RELEVANCE TO (IMAGE ID) | OVERALL RELEVANCE | PEOPLE | OBJECT | LOCATION | ENVIRONMENT |
|---|---|---|---|---|---|---|
| 1 | 5 | 80% | BOB SMITH; JON JONES; WILLIAM POST | PUMPKIN; SKELETONS | BOB SMITH'S HOUSE | OUTDOORS |
| 1 | 10 | 50% | BOB SMITH; JON JONES | PUMPKIN | BOB SMITH'S HOUSE | INDOORS |
| 1 | 45 | 20% | BOB SMITH | NONE | NONE | INDOORS |
| 2 | 67 | 10% | TED JONES | NONE | NONE | NONE |
| .... | .... | .... | .... | .... | .... | .... |

RELATIONAL DISPLAY OF IMAGES

RELATIONAL DISPLAY OF IMAGES

This application is a continuation of U.S. patent application Ser. No. 14/528,318, filed Oct. 30, 2104, which is a continuation of U.S. patent application Ser. No. 14/219,422, filed Mar. 19, 2014, and issued as U.S. Pat. No. 8,902,361 on Dec. 2, 2014, which is a continuation of U.S. patent application Ser. No. 13/651,616 filed Oct. 15, 2012, and issued as U.S. Pat. No. 8,717,500 on May 6, 2014, the disclosures of which are herein incorporated by reference in their entirety.

FIELD OF THE DISCLOSURE

The present disclosure relates generally to displaying images, and more particularly to displaying images related to a particular image based on content of the particular image.

BACKGROUND

Image acquisition devices such as digital video and picture cameras allow users to record images of various people, settings, and events. After images have been captured, the images are often loaded onto a local or remote storage device, such as a hard drive for later review and/or retrieval. Since storage devices can contain a large number of images, it can be hard for users to find particular images. Typically, users must search manually through stored images to find particular images of interest. In addition, if a user would like to view images containing similar content depicted in a particular image, the user must additionally search through many images.

SUMMARY

In one embodiment, a method for displaying images includes displaying a primary image and a plurality of secondary images. The size of each of the secondary images displayed is based on a relevance of the secondary image to the primary image. A user selects a primary image for display from a plurality of images. A subset of the plurality of secondary images can be displayed clustered together based on image associated with each image of the subset matching particular image data associated with the primary image. The display of the plurality of secondary images can be in response to receiving a gesture associated with the primary image. In one embodiment, the primary image is a frame selected from a video. Selection of a different primary image causes a change in the plurality of secondary images displayed. The primary image overlaps one of the plurality of secondary images according to cluster display rules. Images can be removed from a subset by a user inputting a gesture associated with an image of the subset. A subset can be declustered in response to receiving a gesture associated with the subset.

An apparatus and computer readable medium for displaying images including displaying a primary image and a plurality of secondary images is also described.

These and other advantages of the disclosure will be apparent to those of ordinary skill in the art by reference to the following detailed description and the accompanying drawings.

DETAILED DESCRIPTION

According to one embodiment, a plurality of secondary images is displayed to a user in response to a user selecting a primary image. The plurality of secondary images displayed to the user is based on image data associated with the primary image, such as the date and time the image was captured, people, objects, locations, and landmarks, matching image data associated with each of the plurality of secondary images. Image data associated with the primary image and each of the plurality of secondary images, in one embodiment, is determined prior to display of the images, such as when the images are uploaded to a computer. The determined image data is used to compare images in order to determine images having matching image data. Thus, according to one embodiment, a user is presented with a plurality of secondary images related to a primary user selected image instead of a user having to search through a large number of images to find images containing similar content.

Figure 1:
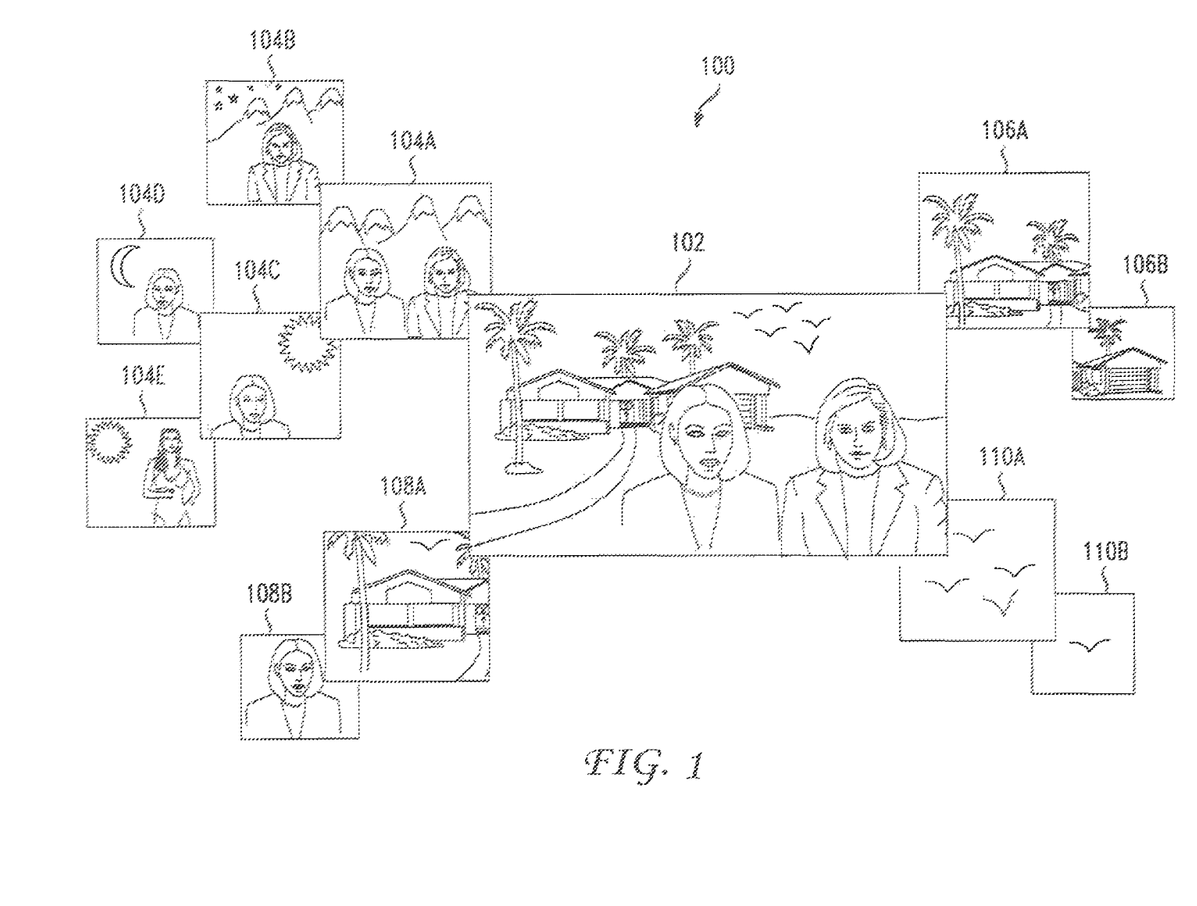
FIG. 1 depicts a plurality of images displayed according to one embodiment.

FIG. 1 depicts a plurality of images 100 displayed according to one embodiment in which a primary image 102 is displayed with a plurality of secondary images 104-110. A user selects primary image 102 in one of various ways described herein, and in response, the plurality of secondary images 104-110 are displayed. Secondary images 104-110 are selected for display with primary image 102 based on image data associated with primary image 102 matching image data associated with each of secondary images 104-110. In one embodiment, a size of each of the plurality of secondary images 104-110 is based on a relevance of each respective one of the plurality of secondary images 104-110 to primary image 102. In one embodiment, the plurality of secondary images is divided into one or more subsets of images (also referred to as clusters). For example, secondary images 104A-104E form a cluster of images depicting the same people depicted in primary image 102. Secondary images 106A and 106B form a cluster of images depicting an object similar to an object depicted in primary image 102, in this case, a house. Secondary images 108A and 108B form a cluster of images which were recorded and/or captured near the same date and time as primary image 102. Secondary images 110A and 110B form a cluster of images depicting objects similar to an object depicted in primary image 102, in this case, birds. Various hardware can be used to display images to a user, receive user input, and determine secondary images to display based on a primary image.

Figure 2:
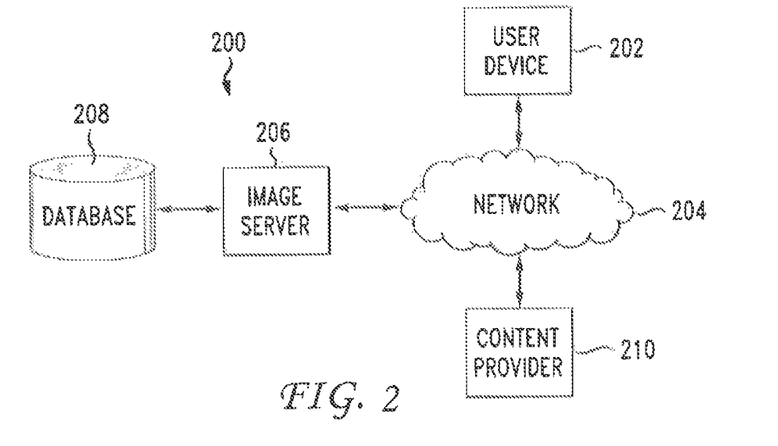
FIG. 2 depicts a schematic of a system in which one embodiment of a method for displaying images may be implemented.

FIG. 2 shows a schematic of a system 200 in which one embodiment of a method for displaying related images may be implemented. User device 202 is an electronic device such as a personal computer, tablet computer, personal digital assistant, smart phone, or cell phone. User device 202 is in communication with image server 206 via network 204 which can be any type of wired or wireless network. Network 204 can vary in size from a local area network to a wide area network. Network 204, in one embodiment, is the Internet. User device 202 may alternatively be connected directly to image server 206. As shown in FIG. 2, image server 206 is also in communication with content provider 210 via network 204. Although only one content provider is shown, image server 206 can connect to multiple content providers via network 204. Content provider 210 may be one of various providers such as businesses or individuals providing information to others via network 204. Although not shown in FIG. 2, image server 206 can be connected via network 204 to additional sources of information including both public sources such as businesses and private sources such as individuals. Image server 206 is in communication with database 208 which stores images and associated data such as metadata and audio related to an image. Image server 206 can acquire images from both user device 202 (e.g., images captured or otherwise obtained by a user associated with user device 202) and content provider 210. In one embodiment, user device 202 contains all functionality of image server 206 and database 208. In this embodiment, information may be received by user device 202 from content provider 210 via network 204 or from database 208.

Figure 3:
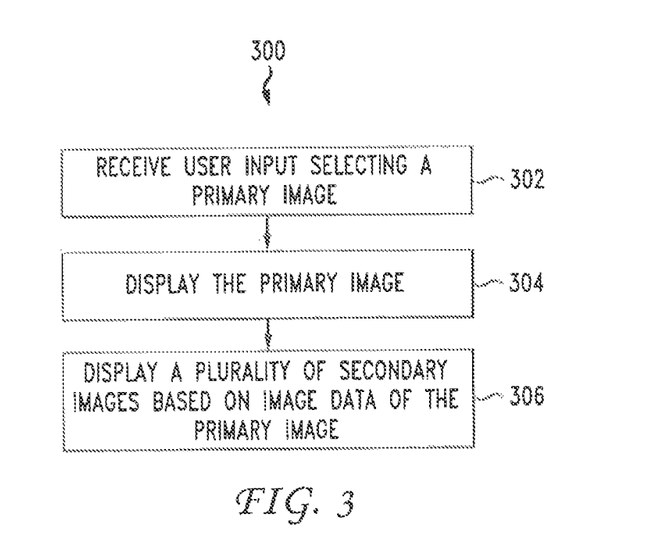
FIG. 3 depicts a flowchart of a method for displaying related images to a user according to one embodiment.

FIG. 3 depicts a method 300 for displaying related images to a user according to one embodiment. At step 302, user device 202 (shown in FIG. 2) receives user input selecting a primary image. In one embodiment, the primary image is selected from a plurality of stored images displayed to a user. The user selects one of the images, for example, by touching a desired image via a touch screen display of user device 202. At step 304, primary image 102 is displayed in response to the input received in step 302. In one embodiment, primary image 102 is displayed substantially centered in the display of user device 202 having a size smaller than the size of the display to facilitate display of additional images around a periphery of primary image 102. At step 306, user device 202 displays a plurality of secondary images 104-110 based on image data of primary image 102 selected at step 302. The plurality of secondary images 104-110, in one embodiment, is displayed on the display about a periphery of primary image 102. In one embodiment, secondary images 104-110 are clustered based on content of the secondary images. For example, as described above, secondary images 104A-104E contain content similar to particular content depicted in primary image 102. In this example, secondary images 104A-104E depict the same people determined to be depicted in primary image 102. Secondary images for display with a primary image are determined, in one embodiment, based on image data contained in image tables.

Image data consists of information associated with an image (e.g., date/time image was captured), information regarding the content of an image (e.g., people, objects, and environments depicted in an image), and information regarding relevance of one image to another image.

Figure 4:
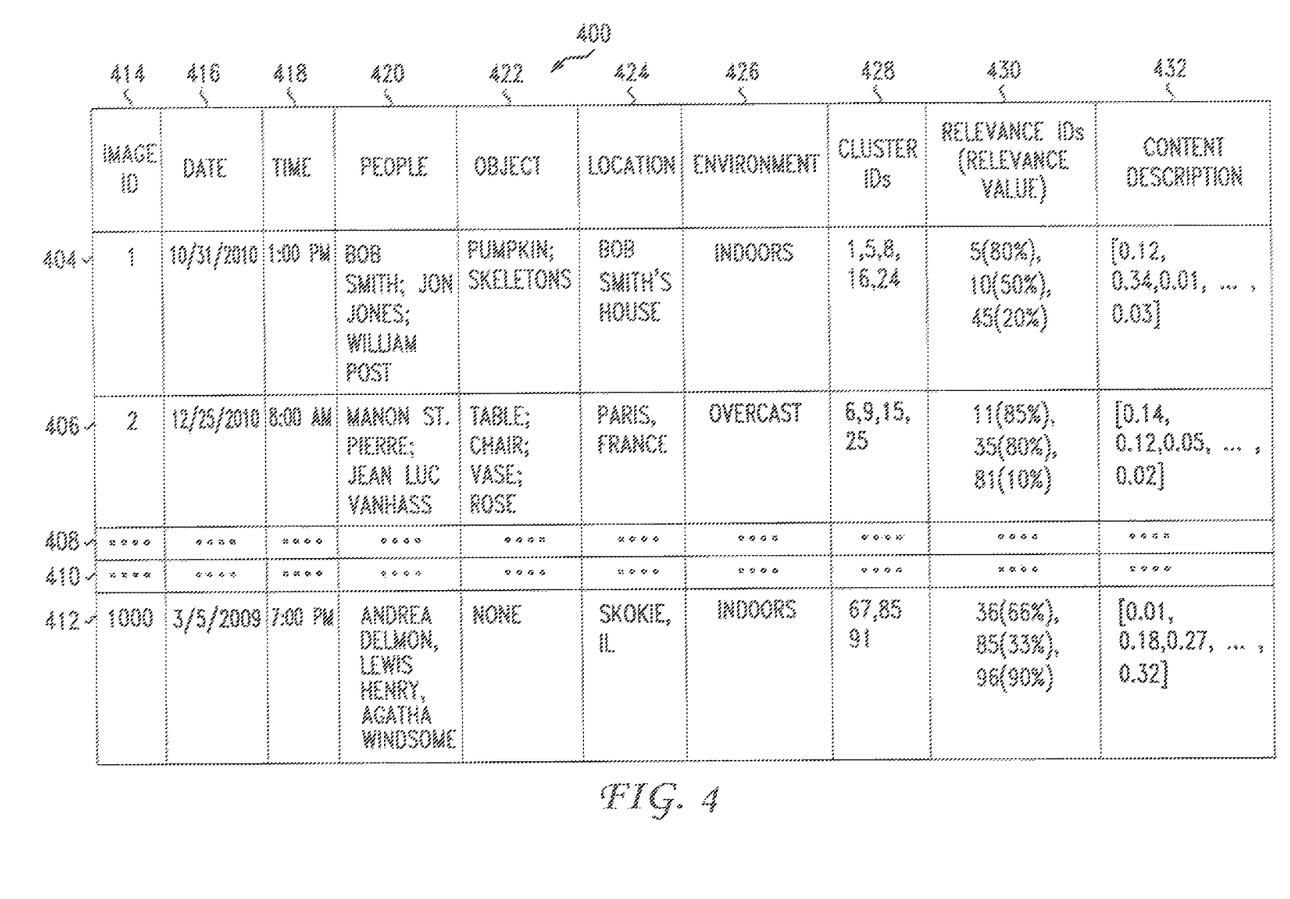
FIG. 4 depicts an image table according to one embodiment.

FIG. 4 depicts an example of how image data corresponding to particular images may be stored as image table 400 in database 208 according to one embodiment. Each image record 404, 406, 408, 410, 412, etc. has a unique image ID 414. Each image record 404-412 has multiple fields associated with it, for example, date 416 and time 418 which identify when an image was captured. People field 420 contains the names of people depicted in the associated image. Similarly, objects field 422 and location field 424 contain information concerning objects depicted in an associated image and the location depicted in the associated image, respectively. Environment field 426 contains information concerning the environment depicted in an associated image (e.g., indoors, outdoors, weather, etc.). In one embodiment, people field 420, objects field 422, location field 424, and environment field 426 may be populated through an automatic or semi-automatic method. Cluster IDs field 428 contains a cluster identification number for each cluster a particular image ID is associated with. Clusters are groups of images having similar content and are described in further detail below. Relevance IDs field 430 contains image IDs of images and their respective relevance value that are relevant to the image identified in Image ID field 414 of the associated record. In one embodiment, an image ID and a relevance value are provided for relevant images. For example, record 404 for Image ID "1" indicates that image ID "5" is relevant to image ID "1". Image ID "5" is indicated to be 80% relevant to image ID "1" as shown by the relevance value in parenthesis next to the image ID (i.e., "5(80%)"). A relevance value of a particular image with respect to another image is determined, in one embodiment, based on how closely the content of the images are similar. A relevance value, in one embodiment, is a value from 1 to 100% where a relevance value of 100% indicates that two images are identical. Values less than 100% indicate that two images are similar, but not identical. Relevance values are determined based on how similar the content of two images is. In one embodiment, the semi-automatic or automatic method that populates the people field 420, objects field 422, etc. may also produce a relevance value for each field. In this embodiment, each record 404-412 contains information comparing a single image to another image in contrast to column 430 of FIG. 4 which contains information pertaining to the relevance of several images to a particular image. Content descriptors field 430 contains information pertaining to general visual features that describe content of an image. In one embodiment, content descriptors field 430 contains an intensity histogram that can be used to compute the visual similarity between images. For example, content descriptors field 432 of record 404 is shown in FIG. 4 containing an intensity histogram (i.e., [0.12], [0.34], 0.01, . . . , 0.03]) which can be used to compare image ID "1" with other images (e.g., image ID "2" or "1000").

Figure 5:
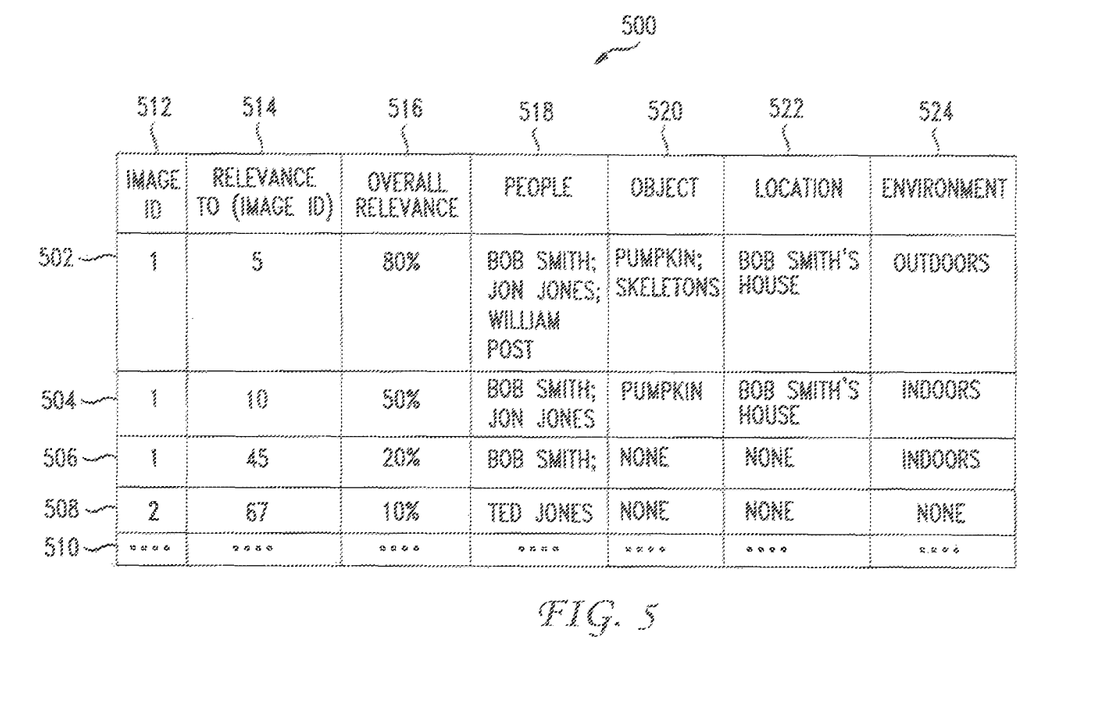
FIG. 5 depicts a relevance table according to one embodiment.

FIG. 5 depicts an example of how relevance data corresponding to two images may be stored as relevance table 500 in database 208 according to one embodiment. Each image record 502, 504, 506, 508, 510, etc. has a unique image ID 512. Each image record 502-510 has multiple fields associated with it. Relevant to (Image ID) field 514 contains an image ID number which identifies an image to which the image identified in Image ID field 512 is being compared to. For example, in record 502 relevance information is provided based on image ID "1" compared to Image ID "5" listed in the Relevant to (Image ID) field 514 of record 502. Overall relevance field 516 contains a value which represents how similar the content of one image is to another image. People field 518 contains a list of people identified in both the image identified in Image ID field 512 and the image identified in Relevant to (Image ID) field 514. Similarly, objects field 520, location field 522, and environment field 524 identify objects, locations, environments identified in both the image identified in Image ID field 512 and the image identified in Relevant to (Image ID) field 514. In one embodiment, people field 518, objects field 520, location field 522, and environment field 524 may be populated using an automatic or semi-automatic method that, in addition, produces a relevance value for information generated for each field. For example, an automatic method can analyze an image and assign a relevance value of 50% to both rainy and sunny types within environment field 524 for a picture depicting a cloudy day. The overall relevance of one image to another is determined, in one embodiment, based on the how closely content depicted in one image match content in another image. It should be noted that the values contained in Overall Relevance field 516 of FIG. 5 are the same relevance values shown in Relevance IDs field 430 of FIG. 4 for respective images. For example, record 502 of FIG. 5 indicates that Image ID "1" is relevant to Image ID "5" with an overall relevance of "80%" and record 404 of FIG. 4 indicates that Image ID "1" is relevant to Image ID "5" with an overall relevance of "80%" as indicated by in Relevance IDs field 430 by the entry "5(80%)". In one embodiment, relevance values are obtained in part by calculating overall relevance values between all pairs of images, sorting the images by relevance values, and retaining a list of the most relevant images for each image.

Figure 6:
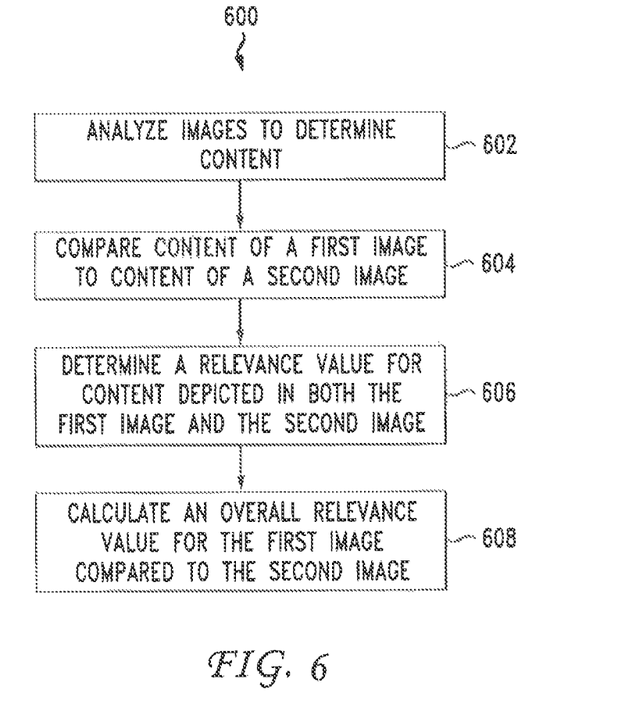
FIG. 6 depicts a flow chart of a method for analyzing images according to one embodiment.

FIG. 6 depicts a method 600 for analyzing images and determining how relevant one image is to another. At step 602, image server 206 analyzes images to determine content depicted in the images. A method for automated analysis and identification of a person in image and video content can be used to determine content of images as described in U.S. patent application Ser. No. 13/207,974, filed Aug. 11, 2011 which is incorporated by reference herein in its entirety. Image table 400 and relevance table 500, in one embodiment, are populated with information when an image is uploaded to image server 206.

At step 604, image server 206 compares image data of a first image to image data of a second image. In one embodiment, the comparison consists of comparing the information contained in each of fields Date 416, Time 418, People 420, Objects 422, Location 424, and Environment 426 associated with one record to the same fields associated with another record. Matching image data identified by comparing information contained in fields 420-426 can be stored in fields 518-524 of a record in relevance table 500. For example, record 502 shown in FIG. 5 indicates that Image ID "1" is relevant to Image ID "5" with an Overall Relevance of "80%". Fields 518-524 indicate the specific image data that has been determined to be depicted in both Image ID "1" and Image ID "5". People field 518 of record 502 indicates that "Bob Smith; Jon Jones; William Post" are depicted in both Image ID "1" and Image ID "5". Similarly, fields 520-524 identify objects depicted, the location depicted, and the environment depicted in both Image ID "1" and Image ID "5".

At step 606, image server 206 determines a relevance value for image data associated with both the first image and the second image. Individual relevance values are determined for each of People field 518, Objects field 520, Location field 522, and Environment field 524. In one embodiment, the fields may be weighted in order to emphasis one field over another in a determination of overall relevance. In one embodiment, individual relevance values for each of People field 518, Objects field 520, Location field 522, and Environment field 524 may be stored in relevance table 500 (not shown). In one embodiment, the date and time images were captured may also be considered in the determination of a relevance value.

At step 608, image server 206 calculates an overall relevance value for image data associated with the first image compared to image data associated with the second image. In one embodiment, the overall relevance value for the first image is based on individual relevance values for image data associated with the first image which matches image data associated with the second image. The calculated value, in one embodiment, is then stored in Overall Relevance field 516 shown in FIG. 5.

Images, in one embodiment, may be clustered together based on image data of a particular image matching the same image data for another image. For example, images which are determined to depict the same people may be clustered together. In one embodiment, image clusters are determined during image analysis and clusters to which a particular image are determined to be grouped with are identified in Cluster IDs field 428 of image table 400.

As described above, image server 206 analyzes images to determine image data of the images and then compares image data of the images to determine the relevance of an image to other images. Although the methods above are described as performed on image server 206 at the time images are uploaded, these methods may be implemented on other hardware such as user device 202 and at other times, such as when an image is selected as a primary image.

Returning to FIG. 1, a plurality of images 100 is displayed comprising primary image 102 surrounded by a plurality of secondary images 104-110 via a touch screen display of user device 202. In one embodiment, primary image 102 is selected by a user performing a gesture, such as a pinch gesture, on the touch screen over the desired image. The pinch gesture is performed by a user placing the tips of two digits, such as the tip of the index finger and the tip of the thumb, on the surface of the touch screen over the desired image with the tips separated by a short distance. The tips of the digits are then moved toward one another in a pinching type motion which, in one embodiment, ends when the tips of the digits contact one another in substantially the center of the desired image. User device 206 identifies the pinch gesture and the desired image over which the pinch gesture was performed and, in response, displays primary image 102 surrounded by a plurality of secondary images 104-110 on a touch screen display of user device 202 as shown in FIG. 1.

In one embodiment, secondary images 104-110 are grouped into clusters wherein each cluster contains images with image data similar to particular image data of primary image 102. For example, a cluster comprising images 104A-104E depicts images depicting the same people depicted in primary image 102. Similarly, images 106A and 106B comprise a cluster of images depicting houses similar to the house depicted in primary image 102 while images 110A and 110B depict images containing birds similar to the birds depicted in primary image 102. Images 108A and 108B form a cluster of images which have a date and time of capture close to the date and time at which primary image 102 was captured. Any number of secondary images can be displayed, however, the number of secondary images displayed is generally limited by the size and resolution of the touch screen display. In one embodiment, the number of images displayed on the touch screen is limited to fifteen.

As depicted in FIG. 1, secondary images 104-110 are displayed having various sizes. The size of each of the secondary images, in one embodiment, is based on the relevance of the particular image with respect to primary image 102. For example, secondary image 106A is displayed with a larger size than image 106B. This is because image 106A has been determined to have a higher overall relevance (Overall relevance field 516 of FIG. 5) to primary image 102 than image 106B. In this example, the higher relevance of 106A is because image 106A depicts an image of the same house depicted in primary image 102 while image 106B depicts an image of a house that is similar to the house depicted in primary image 102 but is not identical. In one embodiment, the size of each of the plurality of secondary images 104-110 is based on a relevance value for each image stored in Overall Relevance field 516 of relevance table 500 shown in FIG. 5.

FIG. 1 depicts primary image 102 and secondary images 104-110 displayed in a static manner. In one embodiment, images may be displayed in a dynamic manner. For example, each of secondary images 104-110 may be animated in sequence to move from the location shown in FIG. 1 to substantially the center of the screen at a larger size and then return to the image's original location and size as shown in FIG. 1. Displaying images in a dynamic manner provides a user with another method for viewing secondary images 104-110 at a larger size without selecting an particular image for display occupying the entire display.

FIG. 1 depicts a single primary image, namely, primary image 102. In one embodiment, more than one primary image may be selected for display. In response to selection of two or more primary images, selected primary images are displayed in substantially the center of the display with secondary images surrounding the primary images. The secondary images for display are selected based on combined characteristics of selected primary images. For example, if a first primary image depicts a first person and the second primary image depicts a second person, secondary images will be selected for display based on whether each the secondary images depicts the first person, the second person, or both.

In one embodiment, a user can select an image to view in a full screen using a gesture, such as a tap gesture (i.e. tapping the touch screen over a particular image). In response to the gesture detected on the touch screen over a particular image, the particular image is displayed at a size which occupies substantially the entire touch screen. A user can return to the previous display using another gesture, such as tapping the touch screen again. Alternatively, a user could perform another gesture, such as the pinch gesture, on the touch screen over the full screen display of the image and, in response, user device 202 displays the associated image as a primary image with a plurality of secondary images relevant to the primary image in a manner similar to the plurality of images depicted in FIG. 1.

Additional gestures can be used to change the display of images. A spread gesture comprises a user touching the touch screen with the tips of two digits, such as the tip of the index finger and the tip of the thumb, close together over an image and then spreading the tips of the digits apart. In one embodiment, in response to a spread gesture, an image that was previously displayed in response to a pinch gesture can be displayed occupying the entire screen of the touch screen display. In one embodiment, a gesture, such as a tap gesture can be used to return a displayed image to a full screen display from an image size displayed smaller than full screen (i.e., an image displayed as a primary image surrounded by secondary images returned to a full screen display of the image.)

Figure 7:
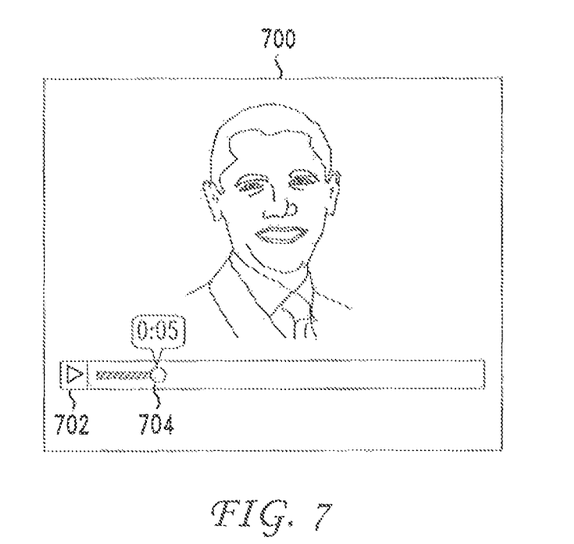
FIG. 7 depicts a display for viewing video according to one embodiment.

FIG. 7 depicts a display for viewing video according to one embodiment in which images from the video can be selected as a primary image. Playback of video 700 can be controlled by a user via play icon 702 and drawer 704. A user can navigate to a particular frame of video using play icon 702 and drawer 704. A user can then perform a gesture, such as a pinch gesture, on the touch screen over the desired image and, in response, the selected image is used as a primary image for display along with a plurality of secondary images. It should be noted that the gesture can be input when the video is playing or paused. In one embodiment, a user can select a particular frame of video while the video is playing and the desired image is displayed. The selection of a particular frame while the video is playing can be entered by a user in various ways such as a gesture, an interface input such as mouse click, or a voice command. In one embodiment, delay in user input may be accounted for by identifying a subset of frames of video displayed prior to receiving user input. One of the subset of frames is then used as the selected frame. For example, a frame of video displayed immediately prior to the frame of video displayed when a user input is received may be identified as the selected frame to compensate for a user's reaction time. In one embodiment, a set of keyframes for a video are identified. Keyframes are particular frames of a video. Keyframes, in one embodiment, are selected in order to provide an overview of the entire video. Keyframes can be identified and selected for inclusion in the set of keyframes based on changes in the image such as a scene change, a change in the number of people depicted, or a change in the objects depicted. In one embodiment, user input selecting a frame of a video for use as a primary image causes a keyframe of video to be used as a primary image. For example, when user input is received during playback of a video, a keyframe displayed in the video immediately prior to the time the user input is received is selected for use as the primary image. Use of keyframes can reduce processing and storage time.

Figure 8:
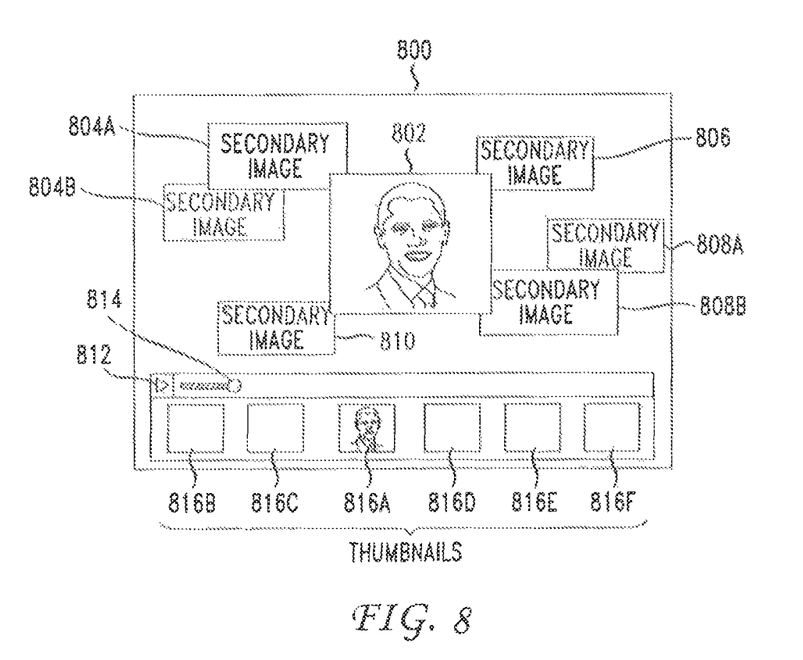
FIG. 8 depicts a display of a frame of a video selected for display as a primary image along with a plurality of secondary images according to one embodiment.

FIG. 8 depicts a display of a selected frame of a video as primary image 802 along with a plurality of secondary images 804-810. Similar to the display of images depicted in FIG. 1, secondary images 804-810 are clustered into groups of related images. For example, images 804A and 804B are grouped into a cluster because the images depict related content. Thumbnails 816 located below drawer 814 display frames of video and facilitate finding a particular image or scene of a video. Thumbnail 816A is displayed as a smaller version of primary image 802 and is shown at regular intensity (not grayed out). Other thumbnail images 816B-816F, in one embodiment, are shown grayed out and display other frames of video which occur before thumbnail 816A (i.e., thumbnails 816B and 816C) and after thumbnail 816A (i.e., 816D-816F). A user can change thumbnails 816 displayed by dragging drawer 814 to the left or right. In response to dragging drawer 814, the images displayed as thumbnails 816A-816F change based on the position of drawer 814. In one embodiment, primary image 802 changes based on the image displayed in thumbnail 816A. In other embodiments, primary image 802 changes in response to a user selecting a thumbnail 816 by performing a gesture, such as a tap gesture, on the touch screen over the desired thumbnail.

In one embodiment, a user can input a gesture, such as a flick away gesture, to remove images from a group such as a cluster. A flick away gesture is performed by a user touching an image with the tip of a digit, such as with the tip of an index finger, and then quickly dragging the image away from a group of images in which the image is displayed. In one embodiment, an image selected by the user touching the touch screen over the image may be highlighted, enlarged slightly, or otherwise changed in order to visually indicate acknowledgement of the selection. In one embodiment in which an image is flicked away (i.e., removed) from a plurality of displayed images, the remaining images may be readjusted (also referred to as re-settled) in order to take advantage of space left on the display after removal of the image. In other embodiments, the location of the removed image is left blank in order to not disturb a user's understanding of how existing images were arranged.

A come together gesture is used in one embodiment to form a group. Similar to the pinching gesture, two digits are used. One digit tip, such as the tip of an index finger, is used to touch a first image and another digit tip, such as the tip of a thumb, is used to touch a second image. The digit tips are then moved toward one another and, in response, the images are grouped together. In one embodiment, the grouped images are identified in a database table, such as in Cluster IDs field 428 shown in FIG. 4. The grouped images are identified, in one embodiment by depicting a boundary line around the two images. In other embodiments, the grouped images can be stacked or otherwise overlapped.

A shatter gesture (also referred to as an obliterate gesture) is used in one embodiment to eliminate a grouping of images (also referred to as declustering). The shatter gesture is a multi-digit gesture in which the tips of three or four digits located close together are used to touch the screen over a particular group of images. The tips of the digits are then moved away from each other and, in response, the images of the group are shown moving away from each other until a predetermined breakpoint is reached at which time the grouping of the images is separated into individual images. In one embodiment, in response to shattering a group of images, Cluster IDs field 428 shown in FIG. 4 may be changed to remove a cluster ID number associated with the group which has been shattered.

Additional inputs may be used to manipulate the display of images. In one embodiment, gestures can be augmented using voice commands. For example, a person can select an image from a plurality of images by tapping the touch screen over the desired image and saying "show me pictures of these people for the last year." In response, a primary image of the selected image can be displayed along with a plurality of secondary images all of which were captured within the last year. Many devices have sensors to detect orientation of the device. These sensors, in one embodiment, are used to accept input from a user. For example, drawer 814 shown in FIG. 8 could be moved to the left or right in response to a user tilting user device 202 to the left or right. In one embodiment, cameras included with devices may be used to receive user inputs, such as head nods or shakes, visually.

Returning to FIG. 1, clusters 104-110 comprise images that have related image data wherein the images for each cluster are determined based on image data of primary image 102. In one embodiment, a user can select images to be grouped in a cluster. For example, a user may select images from a display of stored images and then select to group the images into a cluster. In one embodiment, a user can enter information related to the cluster such as a description of the cluster. User generated clusters can then be displayed with a primary image based on the description of the cluster or the image data associated with the images of the cluster.

Figure 9:
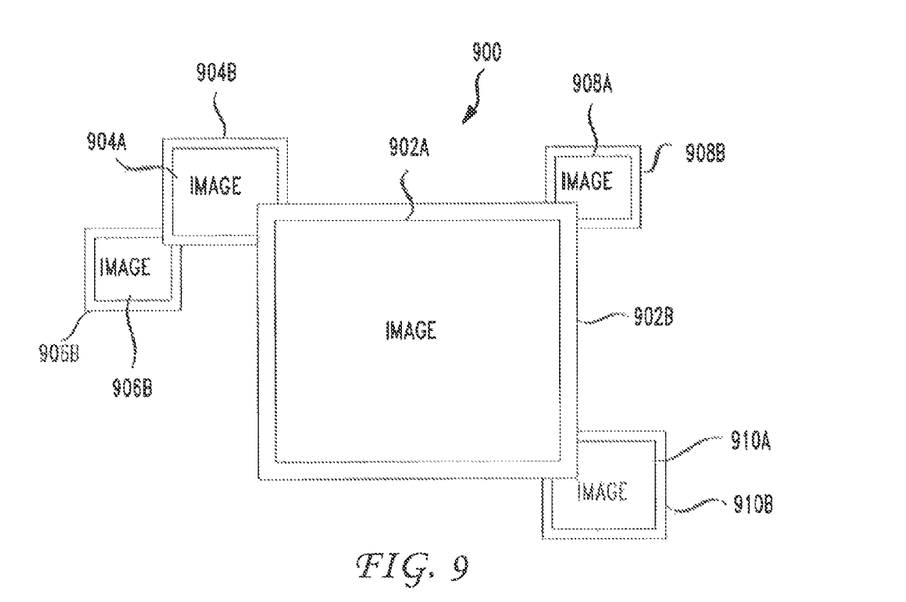
FIG. 9 depicts a plurality of overlapping images according to cluster grouping rules.

FIG. 9 depicts a plurality of images 900 overlapping according to cluster display rules. The purpose of the cluster display rules are to prevent occlusion of a first image by excessive overlap of the first image by a second image. In one embodiment, each image has an overlap region based on a size of the image. For example, image 902A is shown having overlap region 902B. In one embodiment, an overlap region is approximately 30 pixels for a large sized image, 20 pixels for a medium sized image, and ten pixels for a small sized image.

Figure 10:
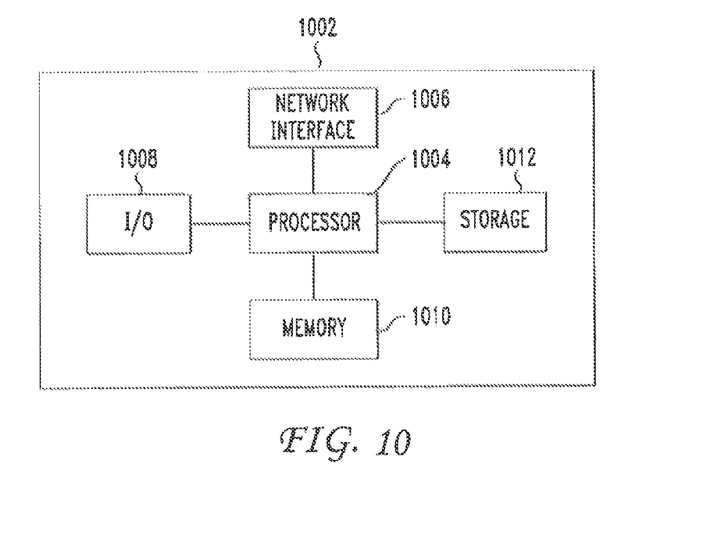
FIG. 10 depicts a high-level block diagram of a computer for displaying images according to one embodiment.

User device 202, image server 206, and content provider 210 may each be implemented using a computer. A high-level block diagram of such a computer is illustrated in FIG. 10. Computer 1002 contains a processor 604 which controls the overall operation of the computer 1002 by executing computer program instructions which define such operation. The computer program instructions may be stored in a storage device 1012, or other computer readable medium (e.g., magnetic disk, CD ROM, etc.), and loaded into memory 1010 when execution of the computer program instructions is desired. Thus, the method steps of FIGS. 3 and 6 can be defined by the computer program instructions stored in the memory 1010 and/or storage 1012 and controlled by the processor 1004 executing the computer program instructions. For example, the computer program instructions can be implemented as computer executable code programmed by one skilled in the art to perform an algorithm defined by the method steps of FIGS. 3 and 6. Accordingly, by executing the computer program instructions, the processor 1004 executes an algorithm defined by the method steps of FIGS. 3 and 6. The computer 1002 also includes one or more network interfaces 1006 for communicating with other devices via a network. The computer 1002 also includes input/output devices 1008 that enable user interaction with the computer 1002 (e.g., display, keyboard, mouse, speakers, buttons, etc.) It should be noted that processor 1004 can perform operations, instruct other devices, elements, or processors to perform operations, or a combination of both. As such, processor One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
receiving user input identifying a primary image;
identifying a plurality of secondary images based on the primary image;
displaying the primary image; and
displaying the plurality of secondary images at a display size based on a relevance of each respective one of the plurality of secondary images to the primary image.

2. The method of claim 1, further comprising:
displaying a subset of the plurality of secondary images clustered based on image data associated with each secondary image of the subset of the plurality of secondary images matching image data of the primary image.

3. The method of claim 2, further comprising:
removing an image from the subset of the plurality of secondary images in response to detecting a gesture associated with the image.

4. The method of claim 2, further comprising:
displaying the subset of the plurality of secondary images declustered in response to detecting a gesture associated with the subset of the plurality of secondary images.

5. The method of claim 1, wherein the displaying the primary image and the displaying of the plurality of secondary images is in response to detecting a gesture associated with the primary image.

6. The method of claim 1, wherein the primary image is a frame of a video.

7. The method of claim 1, wherein the primary image is displayed overlapping one of the plurality of secondary images according to cluster display rules.

8. An apparatus comprising:
a processor; and
a memory to store computer program instructions, the computer program instructions when executed on the processor cause the processor to perform operations comprising:
  receiving user input identifying a primary image;
  identifying a plurality of secondary images based on the primary image;
  displaying the primary image; and
  displaying the plurality of secondary images at a display size based on a relevance of each respective one of the plurality of secondary images to the primary image.

9. The apparatus of claim 8, the operations further comprising:
  displaying a subset of the plurality of secondary images clustered based on image data associated with each secondary image of the subset of the plurality of secondary images matching image data of the primary image.

10. The apparatus of claim 9, the operations further comprising:
  removing an image from the subset of the plurality of secondary images in response to detecting a gesture associated with the image.

11. The apparatus of claim 9, further comprising:
  displaying the subset of the plurality of secondary images declustered in response to detecting a gesture associated with the subset of the plurality of secondary images.

12. The apparatus of claim 8, wherein the displaying the primary image and the displaying of the plurality of secondary images is in response to detecting a gesture associated with the primary image.

13. The apparatus of claim 8, wherein the primary image is a frame of a video.

14. The apparatus of claim 8, wherein the primary image is displayed overlapping one of the plurality of secondary images according to cluster display rules.

15. A non-transitory computer readable medium storing computer program instructions, which, when executed on a processor, cause the processor to perform operations comprising:
  receiving user input identifying a primary image;
  identifying a plurality of secondary images based on the primary image;
  displaying the primary image; and
  displaying the plurality of secondary images at a display size based on a relevance of each respective one of the plurality of secondary images to the primary image.

16. The non-transitory computer readable medium of claim 15, the operations further comprising:
  displaying a subset of the plurality of secondary images clustered based on image data associated with each secondary image of the subset of the plurality of secondary images matching image data of the primary image.

17. The non-transitory computer readable medium of claim 16, the operations further comprising:
  removing an image from the subset of the plurality of secondary images in response to detecting a gesture associated with the image.

18. The non-transitory computer readable medium of claim 15, wherein the displaying the primary image and the displaying of the plurality of secondary images is in response to detecting a gesture associated with the primary image.

19. The non-transitory computer readable medium of claim 15, wherein the primary image is a frame of a video.

20. The non-transitory computer readable medium of claim 15, wherein the primary image is displayed overlapping one of the plurality of secondary images according to cluster display rules.

* * * * *